(12) United States Patent
Ishikawa

(10) Patent No.: US 8,385,889 B2
(45) Date of Patent: Feb. 26, 2013

(54) RADIO COMMUNICATIONS SYSTEM AND METHOD

(75) Inventor: Hidetoshi Ishikawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 279 days.

(21) Appl. No.: 12/689,516

(22) Filed: Jan. 19, 2010

(65) Prior Publication Data
US 2010/0190473 A1 Jul. 29, 2010

(30) Foreign Application Priority Data
Jan. 27, 2009 (JP) ................. 2009-015672

(51) Int. Cl.
*H04M 1/66* (2006.01)
(52) U.S. Cl. ....................... 455/411; 455/410
(58) Field of Classification Search ............ 455/410, 455/411
See application file for complete search history.

(56) References Cited

U.S. PATENT DOCUMENTS

| 7,266,371 | B1 * | 9/2007 | Amin et al. ................ 455/419 |
| 2002/0142753 | A1 | 10/2002 | Pecen et al. |
| 2004/0082346 | A1 | 4/2004 | Skytt et al. |
| 2004/0176092 | A1 * | 9/2004 | Heutschi ................. 455/435.1 |

FOREIGN PATENT DOCUMENTS

| JP | 7-203544 | 8/1995 |
| JP | 2004-518356 | 6/2004 |
| JP | 2005-520422 A | 7/2005 |
| JP | 2008-86046 | 4/2008 |
| WO | WO 98/56201 A2 | 12/1998 |
| WO | WO 98/56201 A3 | 12/1998 |

OTHER PUBLICATIONS

"3rd Generation Partnership Project; Technical Specification Group Core Network and Terminals; Universal Subscriber Identity Module (USIM) Application Toolkit (USAT) (Release 8)", 3GPP TS 31.111 V8.3.0, Sep. 2009, 95 pages.
"Smart cards; UICC-Terminal interface; Physical and logical characteristics (Release1999)", ETSI TS 102 221 V3.13.0, Jan. 2004, 123 pages.
Office Action Issued Aug. 21, 2012 in Japanese Patent Application No. 2009-015672 with English language translation.

* cited by examiner

*Primary Examiner* — Patrick Edouard
*Assistant Examiner* — Shantell L Heiber
(74) *Attorney, Agent, or Firm* — Oblon, Spivak, McClelland, Maier & Neustadt, L.L.P.

(57) ABSTRACT

A radio communications system is disclosed. The system includes a subscriber information management apparatus, and a subscriber authentication module mounted in a mobile terminal connectable to a mobile communications network to which the subscriber information management apparatus is connected. The subscriber authentication module includes a connecting information setting determining unit; a connecting information generating unit; and a connecting information setting unit which sets the connecting information included in a response received from the mobile terminal. The mobile terminal includes a connecting information transmitting unit; a connecting information response receiving unit; and a connecting information transmitting unit. The subscriber information management apparatus includes a temporary connecting information determining unit; a connecting information selecting unit; and a connecting information transmitting unit.

5 Claims, 6 Drawing Sheets

FIG.2

| TEMPORARY IMSI | 440100000000001~440100999999999 |
|---|---|
| NON-TEMPORARY IMSI | 440101000000000~440109999999999 |

FIG.3

| IMSI | TELEPHONE NUMBER | DELIVERED FLAG |
|---|---|---|
| 440100000000001 | — | COMPLETED |
| ... | | |
| 440100999999999 | — | NOT COMPLETED |
| 440101000000000 | 090-3349-68XX | COMPLETED |
| ... | | |
| 440109999999999 | | NOT COMPLETED |

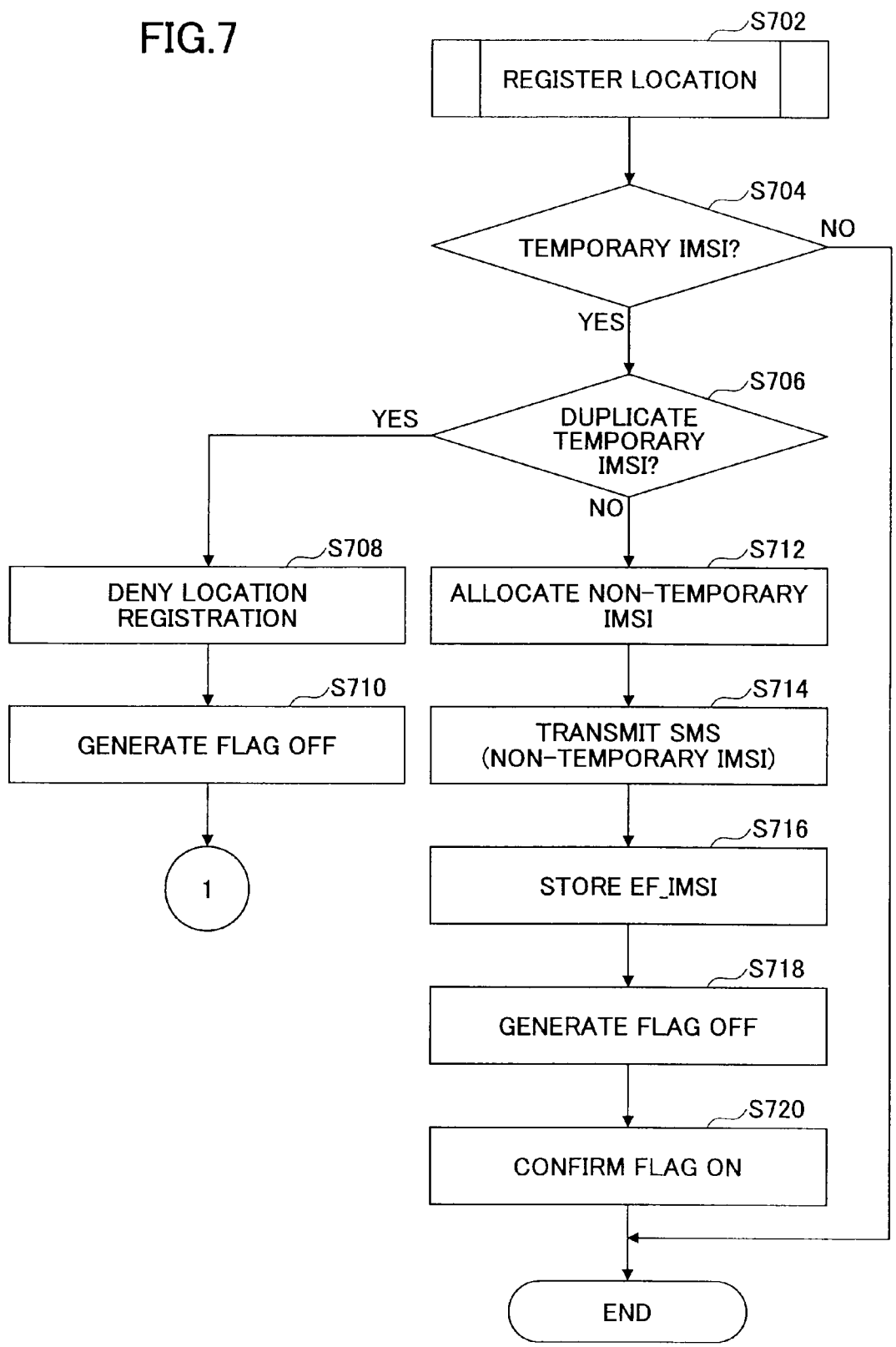

RADIO COMMUNICATIONS SYSTEM AND METHOD

BACKGROUND OF THE INVENTION

1. Field of the Invention

The present invention relates to a radio communications system and method, the system having a subscriber information management apparatus, and a subscriber authentication module mounted in a terminal apparatus connectable to a mobile communications network to which the subscriber information management apparatus is connected.

2. Description of the Related Art

In GSM (Global System for Mobile Communications) and IMT-2000 (International Mobile Telecommunications-2000), a subscriber authentication module issued by a network operator managing a mobile communications network is mounted in a mobile terminal to provide mobile communications services. The subscriber authentication module is called a SIM (Subscriber Identity Module) in the GSM and a USIM (Universal Subscriber Identity Module) in the IMT-2000. Moreover, the subscriber authentication module may also be called a UIM (User Identity Module).

The subscriber authentication module is a contact-type smart card to which a plug-in may generally be added. The subscriber authentication module stores information which is necessary for connecting the mobile terminal and the mobile communications network, the information including location information and an IMSI (International Mobile Subscriber Identity). Then, the subscriber authentication module outputs at the mobile terminal, the information for connecting when a PIN (Personal Identification Number) code input upon the mobile terminal being powered on is proper.

Non-Patent Documents
Non-Patent document 1: 3GPP TS31.111 V8.3.0; and
Non-patent document 2: ETSI TSI02.221

The information for connecting is registered with the subscriber authentication module using an on-line process in a shop or a manufacturing operation of a smart card vendor. When the manufacturing operation of the smart card vendor registers the connecting information in the subscriber authentication module, the international mobile subscriber number out of the connecting information sets is registered in the subscriber authentication module (i.e., "a half-black state", or "a ROM state"). When the on-line process in the shop registers the connecting information in the subscriber authentication module, the international mobile subscriber number is delivered with an on-line process using a customer management system. Therefore, when performing a provisioning process of the mobile terminal at a location where the connecting information cannot be registered in the subscriber authentication module, the subscriber authentication module with pre-registered connecting information needs to be provided.

However, for providing the subscriber authentication module with the pre-registered connecting information, a problem of the supply of connecting information becoming exhausted may be expected to arise depending on the number of connecting information sets delivered. In order to avoid the problem of supply of the connecting information becoming exhausted, it is preferable to generate and deliver the international mobile subscriber mobile information at the time the circuit is provisioned.

SUMMARY OF THE INVENTION

Thus, the present invention seeks to overcome the above-described problems. The object of the present invention is to provide a radio communications system which makes it possible to set a subscriber identification number to be stored in a mobile authentication module of the mobile terminal at the time of entering into a new contract.

In order to solve the problem as described above, the radio communication system of the present invention is provided, the system including a subscriber information management apparatus, and a subscriber authentication module mounted in a mobile terminal connectable to a mobile communications network to which the subscriber information management apparatus is connected, the subscriber authentication module including: a connecting information setting determining unit which determines whether connecting information is set in the subscriber authentication module; a connecting information generating unit which generates temporary connecting information when it is determined by the connecting information setting determining unit that the connecting information is not set; and a connecting information setting unit which sets the connecting information included in a response received from the mobile terminal, wherein the mobile terminal includes a connecting information transmitting unit which transmits, to the subscriber information management apparatus, connecting information including temporary connecting information generated by the connecting information generating unit; a connecting information response receiving unit which receives a response to the connecting information transmitted by the connecting information transmitting unit from the subscriber information management apparatus; and a connecting information transmitting unit which transmits, to the subscriber authentication module, a response received by the connecting information response receiving unit, wherein the subscriber information management apparatus includes a temporary connecting information determining unit which determines whether the temporary connecting information is included in the connecting information based on the connecting information transmitted from the mobile terminal; a connecting information selecting unit which selects connecting information to be set in the subscriber authentication module when it is determined by the temporary connecting information determining unit that the temporary connecting information is included; and a connecting information transmitting unit which transmits, to the mobile terminal, a response including connecting information selected by the connecting information selecting unit.

In an embodiment of the present invention, a method is provided in a radio communications system including a subscriber information management apparatus, and a subscriber authentication module mounted in a mobile terminal connectable to a mobile communications network to which the subscriber information management apparatus is connected, wherein the subscriber authentication module performs the steps of: determining whether connecting information is set in the subscriber authentication module, generating temporary connecting information when it is determined in said determining step that the connecting information is not set; and setting connecting information included in a response received from the mobile terminal, wherein the mobile terminal performs the steps of: transmitting, to the subscriber information management apparatus, connecting information including temporary connecting information generated by the generating step, receiving a response to the connecting information transmitted from the subscriber information management apparatus by said transmitting step, and transmitting, to the subscriber authentication module, a response received by said receiving step, wherein the subscriber information management apparatus performs the steps of: determining, based on connecting information transmitted by the mobile terminal, whether the temporary connecting information is included in the connecting information; selecting connecting information to be set in the subscriber authentication module when it is determined in the temporary connecting information determining step that the temporary connecting information is included, and transmitting, to the mobile terminal, a response including connecting information selected by the selecting step.

The embodiments as described above of the present invention make it possible to set a subscriber identification number to be stored in a subscriber authentication module of a mobile terminal at the time of entering into a new contract.

Other objects and further features of the present invention will be apparent from the following detailed description when read in conjunction with the accompanying drawings.

BRIEF DESCRIPTION OF THE DRAWINGS

FIG. 2 is an explanatory diagram illustrating bandwidths allocated to IMSI according to an embodiment of the present invention;

FIG. 3 is an explanatory diagram illustrating an example of a database included in a subscriber information management server according to an embodiment of the present invention;

FIG. 7 is a flow diagram illustrating an operation of a system according to an embodiment of the present invention.

DETAILED DESCRIPTION OF PREFERRED EMBODIMENTS

In the following, best modes for carrying out the invention are described based on the following embodiments with reference to the drawings.

Throughout the drawings for explaining the embodiments, same letters are used for those elements having the same functions, so that repetitive explanations are omitted.

Radio Communications System

Figure 1:
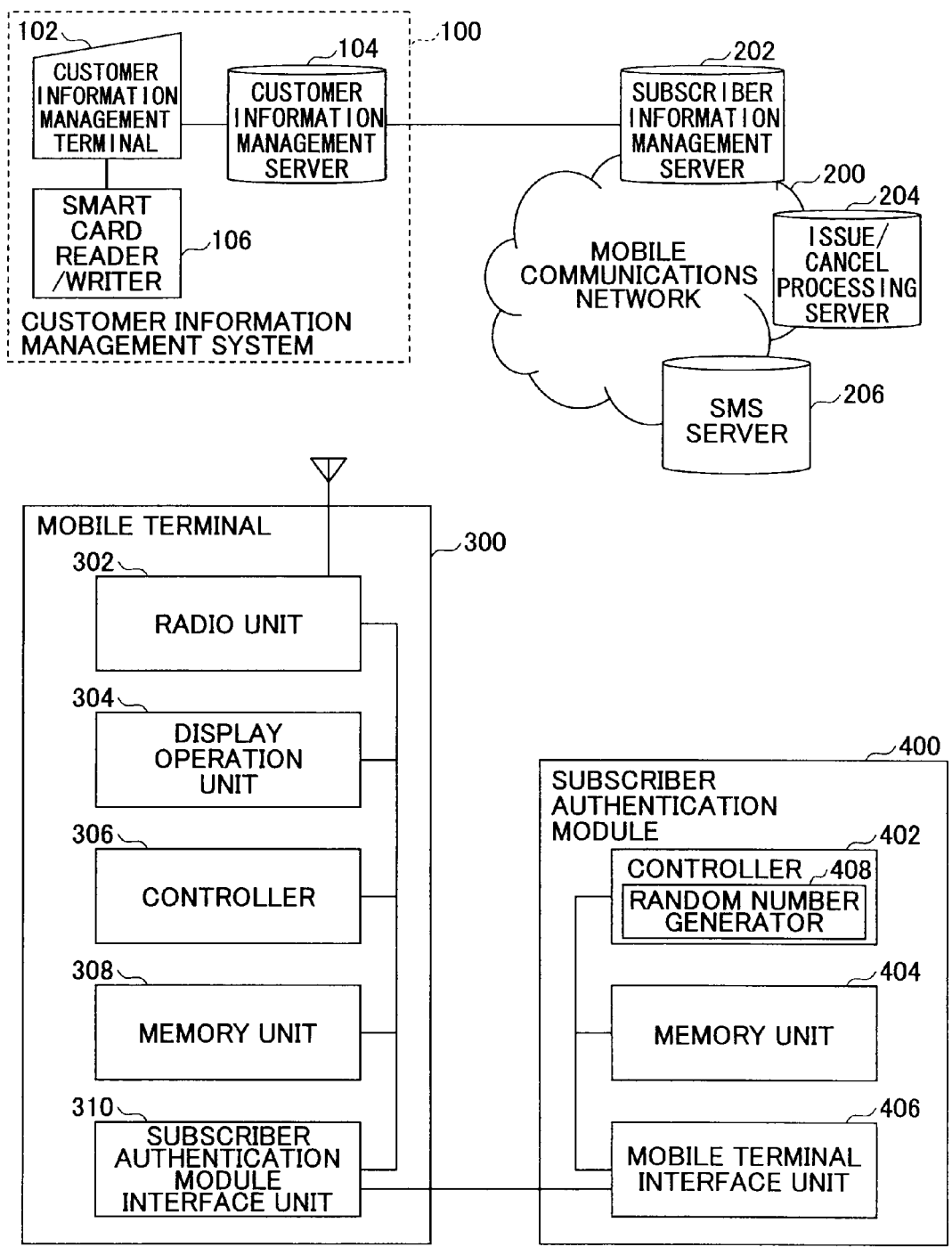
FIG. 1 is a functional block diagram illustrating a system according to an embodiment of the present invention.

FIG. 1 shows a radio communications system according to the present embodiment.

In the present radio communications system, a subscriber authentication module to be inserted into a mobile terminal generates a temporary international mobile subscriber identity or temporary international mobile subscriber ID (IMSI) (below called the temporary IMSI). The mobile terminal attempts a location registration with a subscriber information management server using the temporary IMSI. If the temporary IMSI is determined to be valid, the subscriber information management server continues the location registration process, and otherwise denies the location registration process. If the subscriber information management server determines the temporary IMSI to be valid, an IMSI (below called a non-temporary IMSI) to be actually set in the subscriber authentication module is delivered and wirelessly transmitted to the mobile terminal. The mobile terminal transmits the non-temporary IMSI to the subscriber authentication module, which changes the temporary IMSI to the non-temporary IMSI.

The present radio communications system writes the non-temporary IMSI to the subscriber authentication module at the time of the provisioning process of the mobile terminal. The IMSI being written to the subscriber authentication module at the time of the circuit provisioning process of the mobile terminal eliminates the need for delivering the IMSI in advance and provides a subscriber authentication module with which the IMSI is registered. Therefore, delivering of IMSIs which are not actually utilized may be reduced, making it possible to avoid a problem of the supply of IMSIs becoming exhausted. In the radio communications system, the IMSI is delivered real-time when it is needed in practice, such as for registering the IMSI in order to provision the subscriber authentication module.

The present radio communications system 1000 includes a customer information management system 100, a subscriber information management server 202, an issue/cancel processing server 204, a short message service (SMS) server (below called the SMS server) 206, a mobile terminal 300, and a subscriber authentication module 400.

Customer Information Management System

The customer information management system 100 includes a customer information management terminal 102, a customer information management server 104, and a smart card reader/writer 106.

The smart card reader/writer 106 reads the non-temporary IMSI from the subscriber authentication module 400 according to an instruction by the customer information management terminal 102. The smart card reader/writer 106 inputs the non-temporary IMSI into the customer information management terminal 102.

The customer information management terminal 102 is connected to the customer information management server 104 and the smart card reader/writer 106. The customer information management terminal 102 inputs, with customer information to the customer information management server, the non-temporary IMSI input by the smart card reader/writer 106.

The customer information management server 104 is connected to the subscriber information management server 202. The customer information management server 104 manages the customer information. For example, the customer information management server 104 may collate the customer information and a telephone number to store the collated result.

The customer information management server 202, the issue/cancel processing server 204, and the SMS (Short Message Service) server 206 are connected to the mobile communications network 200.

Subscriber Information Management Server 202

The subscriber information management server 202 performs a location registration process based on the temporary IMSI wirelessly transmitted by the mobile terminal 300. The subscriber information management server 202 receives a temporary IMSI from the mobile terminal 300. If the temporary IMSI is not delivered, the subscriber information management server 202 continues the location registration process. On the other hand, if the temporary IMSI is delivered, the subscriber information management server 202 denies the location registration. When the location registration process is continued, the subscriber information management server 202 utilizes a USAT function to wirelessly transmit the non-temporary IMSI to the subscriber authentication module 400 using the USAT command. More specifically, the subscriber information management server 202 requests of the SMS server 206 that the non-temporary IMSI be transmitted. The SMS server 206 wirelessly transmits the non-temporary IMSI to the mobile terminal 300 according to the request by the subscriber information management server 202. When the non-temporary IMSI is received, the mobile terminal 300 stores the non-temporary IMSI in the subscriber authentication module 400. The non-temporary IMSI being stored in the subscriber authentication module 400 leads to an EF_IMSI value of a memory unit 404 of the subscriber authentication module 400 being updated to the non-temporary IMSI.

The USAT function is a standard function specified in 3GPP TS31.111. The USAT command is specified in ETSI (European Telecommunications Standards Institute) TS102.221.

The USAT command includes a TERMINAL PROFILE, an ENVELOPE, a FETCH, and a TERMINAL RESPONSE. The TERMINAL PROFILE is a command for the mobile terminal 300 to report, to the subscriber authentication module 400, a command supported out of those commands associated with the USAT function. The TERMINAL PROFILE is normally issued when the mobile terminal 300 is turned on/off. The ENVELOPE is a command for communicating, to the subscriber authentication module 400, a data sequence received as an SMS from the mobile communications network 200. The data sequence may include an arbitrary 3G (3rd generation) command, a 2G (2nd generation) or a proactive command, etc. The FETCH is a command for use in issuing the proactive command from the subscriber authentication module 400 to the mobile terminal 300. The TERMINAL RESPONSE is issued when communicating the result of executing the proactive command from the mobile terminal 300 to the subscriber authentication module 400.

The proactive command, which is specified in 3GPP TS31.111, is a command issued from the subscriber authentication module 400 to the mobile terminal 300. With the proactive command, the subscriber authentication module 400 becomes a master, making it possible to control the mobile terminal 300. The proactive command includes: DISPLAY TEXT; PLAY TONE: REFRESH; and SEND SMS. The DISPLAY TEXT displays a text message or an icon on a display of the mobile terminal 300. The PLAY TONE causes the mobile terminal 300 to ring. The PLAY TONE allows tone color and ringing time to be specified. The REFRESH is issued when there is a change in file state or file information within the subscriber authentication module. The REFRESH allows cache information of the mobile terminal 300 to be updated. The SEND SMS allows data to be transmitted from the subscriber authentication module 400 via the mobile terminal 300 to the mobile communications network 200. The SEND SMS may be utilized for reporting a command process result. The short messaging service (SMS) is for transmitting and receiving a short text, primarily between the mobile terminals. It is also used in transmitting and receiving a signal for controlling the mobile terminals.

FIG. 2 shows bandwidths allocated to an IMSI.

In the present system, the bandwidth allocated to the IMSI may be divided into a bandwidth allocated to a temporary IMSI and a bandwidth allocated to a non-temporary IMSI. In other words, numerical ranges allocated to the temporary IMSI and to the non-temporary IMSI are pre-specified. For example, 440100000000001 through 440100999999999 are provided as a bandwidth allocated to the temporary IMSI, while 440101000000000 through 440109999999999 are provided as a bandwidth allocated to the non-temporary IMSI. In a fifteen digit IMSI, the first five digits from the left show a country code (MCC: mobile country code) and a network code (MNC: mobile network code), and the sixth-through-fifteenth digits from the left represent a subscriber identification ID (MSIN: mobile subscriber identification number). More specifically, a country code is shown in 0th through 2nd digits from the left, with Japan being 440, and a network code, which is shown in 3rd through 4th digits from the left, represents a communications operator.

The subscriber information management server 202 determines whether the IMSI is a temporary IMSI by determining whether the IMSI transmitted by the mobile terminal 300 is included in the bandwidth (numerical range) allocated to the temporary IMSI. When the IMSI is included in the bandwidth allocated to the temporary IMSI, the subscriber information management server 202 recognizes that the IMSI is a temporary IMSI, and confirms that the IMSI has not been delivered.

FIG. 3 is an example of a database included in the subscriber information management server 202.

The database collates the IMSI, a telephone number, and a delivered flag to store the collated result. The database collates the telephone number with the IMSI as a main key. The database explicitly indicates, with the delivered flag, a possibility of delivery so as to prevent an occurrence of duplicate deliveries. When the delivery is completed, the database sets a delivered flag for the delivered IMSI. Setting the delivered flag for the delivered IMSI when the delivery is completed makes it possible to prevent the occurrence of duplicate deliveries of the delivered IMSI. The temporary IMSI is a temporarily allocated IMSI, so that it is not collated with the telephone number.

A case is explained for the mobile terminal 300 making a request for location registration by transmitting 440100000000001 as the temporary IMSI. The subscriber information management server 202 determines whether a received IMSI is a temporary IMSI. With the IMSI being included in the bandwidth allocated to the temporary IMSI, the subscriber information management server 202 determines that the IMSI is a temporary IMSI. The subscriber information management server 202 refers to a database as shown in FIG. 3, and determines whether the temporary IMSI has been delivered. According to FIG. 3, the temporary IMSI has been delivered, so that the subscriber information management server 202 denies location registration for the temporary IMSI.

A case is explained for the mobile terminal 300 making a request for location registration by transmitting 440100999999999 as the temporary IMSI. With the received IMSI being included in the bandwidth allocated to the temporary IMSI, the subscriber information management server 202 determines that the IMSI is a temporary IMSI. The subscriber information management server 202 refers to a database as shown in FIG. 3, and determines whether the temporary IMSI has been delivered. According to FIG. 3, the temporary IMSI has not been delivered, so that the subscriber information management server 202 performs location registration using the temporary IMSI. After the location registration, the subscriber information management server 202 sets a delivered flag for the temporary IMSI. Moreover, when the non-temporary IMSI is delivered in association with the temporary IMSI, the subscriber information management server 202 may set the delivered flag for the temporary IMSI back to not-completed state.

Issue/Cancel Processing Server

When an issue processing or cancel processing of the non-temporary IMSI is performed, the issue/cancel processing server 204 is connected to the subscriber authentication module 400. A connection process is performed between the subscriber authentication module 400 and the issue/cancel processing server 204 to make it possible to select a telephone number to be set, out of those telephone numbers selectable by a user.

A case is explained for performing the issue processing of the non-temporary IMSI. The subscriber authentication module 400 stored in the mobile terminal 300 for which the location registration process is being continued in the subscriber information management server 202 connects to the issue/cancel processing server 204 using the USAT function. More specifically, the subscriber authentication module 400 issues a proactive command and the mobile terminal 300 accesses the issue/cancel processing server 204 according to the proactive command. The issue/cancel processing server 204 may transmit selectable telephone numbers that correspond to the non-temporary IMSI to the subscriber authentication module 400, which may cause the mobile terminal 300 to display the selectable telephone numbers. Then, the user selects a telephone number to be set, out of the selectable telephone numbers. In order for the issue/cancel processing server 204 to transmit, to the subscriber authentication module 400, the selectable telephone numbers that correspond to the non-temporary IMSI, the database explained with reference to FIG. 3 may be shared between the subscriber information management server 202 and the issue/cancel processing server 204, or it may be arranged for a similar database to be held by the subscriber information management server 202 and the issue/cancel processing server 204.

The issue/cancel processing server 204 requests the SMS server 206 for the selectable telephone numbers that correspond to the non-temporary IMSI to be transmitted. In response to the issue/cancel processing server 204, the SMS server 206 transmits, to the mobile terminal 300 using an SMS, the selectable telephone numbers that correspond to the non-temporary IMSI. The mobile terminal 300 sends, to the subscriber authentication module 400, the selectable telephone numbers received. Using the proactive command, the subscriber authentication module 400 causes the mobile terminal 300 to display the selectable telephone numbers.

If the user is set to select a telephone number to be set, a telephone number selected by the user is transmitted to the issue/cancel processing server 204. The issue/cancel processing server 204 transmits the selected telephone number to the subscriber information management server 202. The subscriber information management server 202 transmits, to the mobile terminal 300 as the non-temporary IMSI, an IMSI corresponding to the telephone number received from the issue/cancel processing server 204.

A case is explained for performing the cancel processing. When the cancel processing is performed, the issue/cancel processing server 204 performs a process of erasing the non-temporary IMSI held in the subscriber information management server 202 and subscriber authentication module 400. As the IMSI to be erased (the non-temporary IMSI) is specified, the issue/cancel processing server 204 requests the subscriber information management server 202 to erase the IMSI to be erased. The subscriber information management server 202 erases the IMSI according to the request by the issue/cancel processing server 204. Moreover, the issue/cancel processing server 204 requests the SMS server 206 to transmit an SMS including a request for erasing the IMSI (the non-temporary IMSI) to be erased. The SMS server 206 transmits an SMS to erase the IMSI using the USAT function in response to the request by the issue/cancel processing server 204. The mobile terminal 300 initializes the subscriber authentication module 400 according to a request to erase the IMSI included in the SMS transmitted by the SMS server 206. The mobile terminal 300 may initialize EF_IMSI by transmitting a command to update what is stored in the subscriber authentication module 400.

Moreover, the issue/cancel processing server 204 may be set to be initiated by an access from the customer information management system. When it is set to be initialized by the access from the customer information management system, the IMSI to be erased by the customer information management system is specified. The issue/cancel processing server 204, which is initiated by the access from the customer information management system, performs the process for transmitting the selectable telephone numbers that correspond to the non-temporary IMSI as well as the cancel processing as described above.

SMS Server

The SMS server 206 transmits the SMS to the mobile terminal 200 in response a request from the subscriber information management server 202 and the issue/cancel processing server 204. In the SMS, a text-based message may be included, or a signal for controlling the mobile terminal 300 may be included.

Mobile Terminal

The mobile terminal 300 includes a radio unit 302, a display operation unit 304, a controller 306, a memory unit 308, and a subscriber authentication module interface unit 310.

The radio unit 302 processes a radio signal received via an antenna. The radio unit 302 inputs a processed radio signal to the controller 306. The radio signal may include a voice signal and a data signal, etc. Moreover, the radio signal may include broadcast information which is broadcast by a base station (not shown) that is for connecting to the mobile communications network 200. The broadcast information output by the base station includes a country number, an operator code, and base station information. The country number is information showing a country in which the base station is located (or which receives provision of services), the provider code is code information showing a communications operator which provides communications services, and base station information is identification information for specifying one among multiple base stations.

The display operation unit 304, which is a unit for operating the mobile terminal 300, includes an operations unit such as a ten-key unit. Moreover, the display operation unit 304, which is a unit for displaying, includes a display unit such as a display. For performing an outgoing call process for making an outgoing call, the display operation unit 304 accepts a telephone number, or accepts an instruction for making an outgoing call. When the telephone number and the instruction for the outgoing call are received, the display operation unit 304 instructs a controller 306 to make an outgoing call with the telephone number. According to the telephone number and the instruction for making an outgoing call, the controller 306 performs the communications connection process. The display operation unit 304 accepts an input from a user.

The controller 306 makes an initial setting for the subscriber authentication module 400. For example, when the mobile terminal 300 is powered on, the controller 306 accesses the subscriber authentication module 400. More specifically, the controller 306 accesses the memory unit 404 of the subscriber authentication module 400, and determines whether the IMSI (non-temporary IMSI) is set for the EF_IMSI file of the memory unit 404. The controller 306 may determine whether the non-temporary IMSI is set by referring to a flag showing that the IMSI stored in the memory unit 404 has been confirmed. When the IMSI is set for the EF_IMSI file, the controller 306 reads the IMSI. Otherwise, the controller 306 determines whether the temporary IMSI has been generated. The controller 306 may determine whether the temporary IMSI has been generated by referring to a flag showing that the temporary IMSI stored in the memory unit 404 has been generated. Then, when the temporary IMSI has been generated, a location registration (attachment) process is performed by detecting the mobile communications network 200, and transmitting the temporary IMSI to the mobile communications network 200.

The memory unit 308 includes a program storage area, a control data storage area, and a user data storage area. In the program storage area is stored an application program for the controller 306 to execute the control process. In the control data storage area are stored control data generated in the mobile terminal 300, IMSI and subscriber information read from the subscriber authentication module 400, location information of the terminal, security information such as secret identification number, font data on the data display, etc. In the user data storage area are stored data such as user data (e.g., e-mail transmitted and received by the mobile terminal 300), telephone directory data, and outgoing and incoming call history read from the subscriber authentication module 400.

The subscriber authentication module interface unit 310 is an interface between the mobile terminal 300 and the subscriber authentication module 400.

Subscriber Authentication Module

The subscriber authentication module 400 includes a controller 402, a memory unit 404, and a mobile terminal interface unit 406. The controller 402 includes a random number generator 408.

When the mobile terminal 300 is powered on, the subscriber authentication module 400 is also powered on. When the subscriber authentication module 400 is powered on, the controller 402 makes an ATR (answer to request) to the mobile terminal 300. Then, the controller 402 confirms whether the IMSI is set. When the IMSI is not set, the controller 402 generates a temporary IMSI using a predetermined technique. Then, the controller 402 stores the temporary IMSI in the memory unit 404. For example, the controller 402 may include a random number generator 408 so that a random number generated by the random number generator 408 may be set as a temporary IMSI. The random number generator 408 generates a subscriber identification ID with 10 digits, which is what remains after removing 5 digits corresponding to the country code and the network code out of a 15-digit IMSI corresponding to a bandwidth allocated to the temporary IMSI. The random number generator 408 generates the subscriber identification (ID) such that it is included in 440100000000001 through 440100999999999 provided as the bandwidth allocated to the temporary IMSI.

The memory unit 404 includes a file system. In the file system are various files for executing the functions of the mobile terminal 300. The file system may include an elementary file (EF), a master file (MF), an application dedicated file (ADF), and a dedicated file (DF).

EF corresponds to a file such as an OS. The MF, ADF, and DF correspond to folders (directories). The controller 402 stores the temporary IMSI in the EF. For example, an EF_IMSI file may be generated to store the temporary IMSI.

The mobile terminal interface unit 406 is an interface between the subscriber authentication module and the mobile terminal 300.

Operation Sequence (1)

Figure 4:
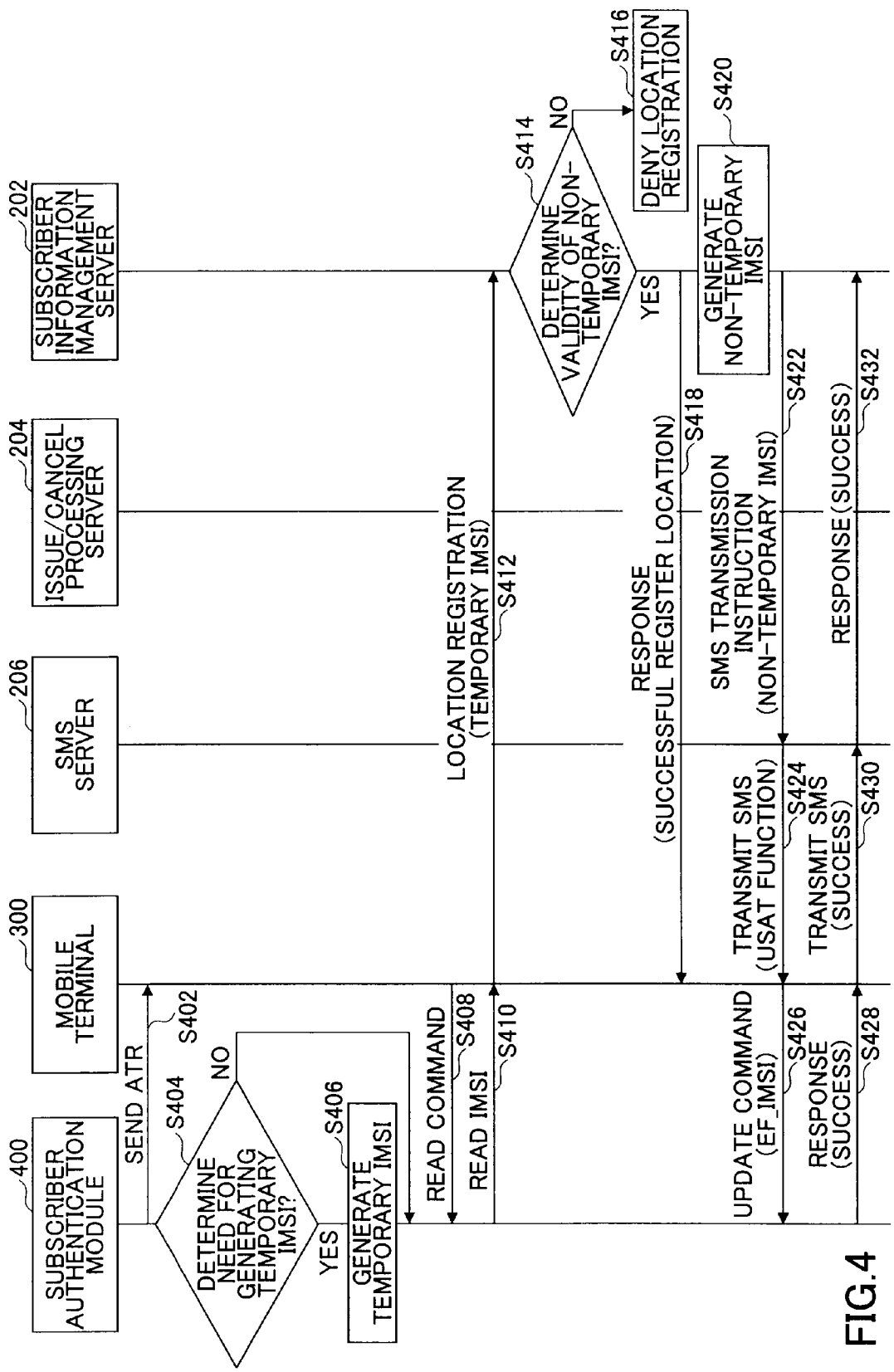
FIG. 4 is a sequence diagram illustrating an operation of a system according to an embodiment of the present invention.

FIG. 4 shows a sequence in which a temporary IMSI is generated and a non-temporary IMSI is installed to replace the temporary IMSI. In FIG. 4, a connection process is not performed between the subscriber authentication module 400 and the issue/cancel processing server 204, so that the subscriber information management server 202 selects an IMSI to be set for the user.

When the mobile terminal 300 is powered on, the subscriber authentication module 400 inserted in the mobile terminal 300 is also powered on.

The subscriber authentication module 400 sends an ATR (answer to request) to the mobile terminal 300 (step S 402). The ATR includes information showing basic capabilities which the subscriber authentication module 400 has (for example, data transmission bit rate and transfer protocol. The controller 402 sends basic information stored in the memory unit 404 to the mobile terminal 300 via the mobile terminal interface unit 406. The mobile terminal 300 recognizes the basic capabilities of the subscriber authentication module 400 based on the ATR sent from the subscriber authentication module 400.

The subscriber authentication module 400 determines whether the temporary IMSI is generated (step S404). The controller confirms the status of IMSI generation in the subscriber authentication module 400, and determines that the temporary IMSI is to be generated when the non-temporary IMSI is not set and the temporary IMSI has not been generated.

When it is determined that the temporary IMSI is to be generated (step 404: YES), the subscriber authentication module 400 generates the temporary IMSI (step 406). When it is determined that the temporary IMSI is to be generated, the temporary IMSI is generated in the random number generator 408. The controller stores the temporary IMSI in the EF_IMSI file of the memory unit 404.

When it is determined that the temporary IMSI is not to be generated (step 404: NO), the subscriber authentication module 400 stands by without generating the temporary IMSI. If the non-temporary IMSI is set, or when the temporary IMSI is generated, it is determined that the temporary IMSI is not to be generated.

The mobile terminal 300 accesses the subscriber authentication module 400 and reads the IMSI (steps S408 and S410). The controller 306 of the mobile terminal 300 sends a READ command via the subscriber authentication module 310 to the subscriber authentication module 400. The controller 306 accesses the EF_IMSI file of the memory unit 404 of the subscriber authentication module 400 and reads the IMSI stored in the EF_IMSI file.

The mobile terminal 300 registers location with the subscriber information management server 202 using the IMSI (temporary IMSI) read from the subscriber authentication module 400 (step S412). The controller 306 of the mobile terminal 300 may be arranged to determine whether the IMSI read from the subscriber authentication module 400 is a temporary IMSI. More specifically, the controller 306 may determine whether the IMSI read from the subscriber authentication module 400 is a temporary IMSI by determining whether it is included in the bandwidth allocated to the temporary IMSI. The controller 306 registers location with the subscriber information management server 202 when the IMSI read from the subscriber authentication module 400 is a temporary IMSI. The controller 306 wirelessly transmits the temporary IMSI to the subscriber information management server 202 via the radio unit 302.

The subscriber information management server 202 determines the validity of the temporary IMSI transmitted by the mobile terminal 300 (step S414). The subscriber information management server 202 determines whether the IMSI transmitted by the mobile terminal 300 is included in the bandwidth allocated to the temporary IMSI. When the IMSI is included in the bandwidth allocated to the temporary IMSI, the subscriber information management server 202 recognizes that the IMSI is a temporary IMSI, and confirms that the temporary IMSI has not been delivered to determine the validity.

When the temporary IMSI is determined to be not valid (step S414, NO), the subscriber information management server 202 denies the location registration with the temporary IMSI (step S416).

When the temporary IMSI is not determined to be not valid (when the temporary IMSI is determined to be valid) (step S414, YES), the subscriber information management server 202 registers location with the temporary IMSI. The subscriber information management server 202 responds to location registration from the mobile terminal 300 (step S418). The response may include information of a successful location registration.

The subscriber information management server 202 generates a non-temporary IMSI (step S420). The subscriber information management server 202 generates the non-temporary IMSI by delivering the non-temporary IMSI in association with the temporary IMSI. The subscriber information management server 202 may make the issue/cancel processing server 204 transmit, to the mobile terminal 300, telephone numbers selectable for use with the non-temporary IMSI.

The subscriber information management server 202 sends a request for transmitting the SMS to the SMS server 206 (step S422). The SMS includes the non-temporary IMSI.

The SMS server 206 transmits, to the mobile terminal 300, the SMS using the USAT function according to an SMS transmission instruction by the subscriber information management server 202 (step S424).

The mobile terminal 300 receives the SMS transmitted by the SMS server 206. The SMS is input from the radio unit 302 to the controller 306. The controller 306 sends the SMS to the subscriber authentication module 400 via the subscriber authentication module interface unit 310 (step S426). For example, the controller 306 sends the SMS to the subscriber authentication module 400 by the update command.

The subscriber authentication module 400 stores the non-temporary IMSI included in the SMS in the subscriber authentication module 400. The controller 402 updates, with the non-temporary IMSI, the temporary IMSI stored in the EF_IMSI of the memory unit 404.

The subscriber authentication module 400 makes a response, to the mobile terminal 300, indicating that the non-temporary IMSI has been stored in the EF_IMSI (step S428). The controller 402 stores the non-temporary IMSI in the EF_IMSI file of the memory unit 404 and makes a response, via the mobile terminal interface unit 406 to the mobile terminal 300, indicating that the storing has succeeded.

When a response is received from the subscriber authentication module 400 indicating that the storing of the non-temporary IMSI has succeeded, the mobile terminal 300 transmits, to the SMS server, an SMS (below called an SMS response) indicating that the process instructed by the SMS has succeeded (step S430).

When the SMS response is received from the mobile terminal 300, the SMS server 206 transmits, to the subscriber information management server 202, a response indicating that the process instructed by the SMS has succeeded (step S432).

Operation Sequence 2

Figure 5:
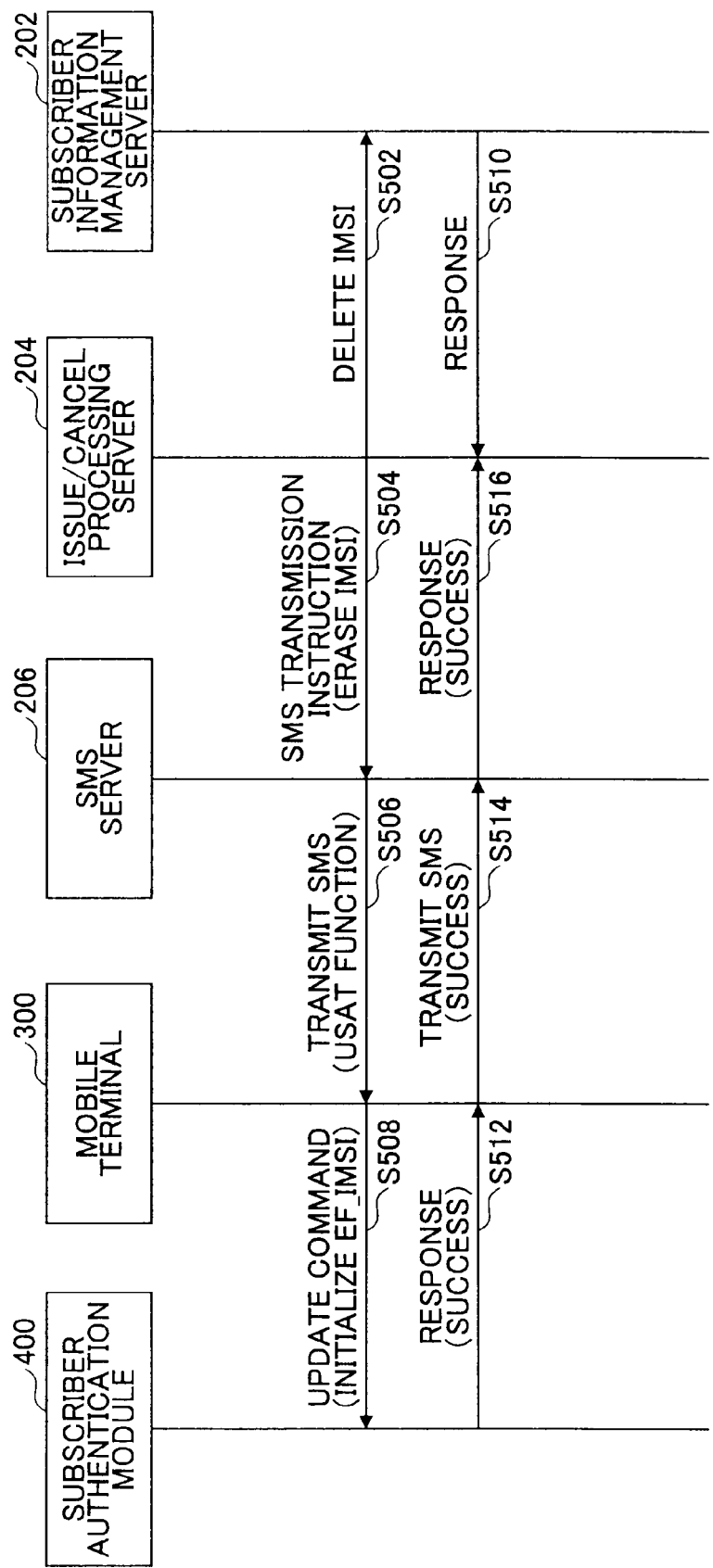
FIG. 5 is a sequence diagram illustrating an operation of a system according to an embodiment of the present invention.

FIG. 5 shows a sequence for the mobile terminal 300 to cancel.

An IMSI to be erased (a non-temporary IMSI) is specified for the issue/cancel processing server 204. For example, the IMSI to be erased may be specified by the user operating the mobile terminal 300, or it may be specified by an access from the customer information management system 100.

The issue/cancel processing server 204 makes a request, to the subscriber information management server 202, for deleting the IMSI specified (step S502). According to the request for deleting from the issue/cancel processing server 204, the specified IMSI is deleted. The subscriber information management server 202 makes a response showing that the specified IMSI has been deleted (step S510).

Moreover, the issue/cancel processing server 204 instructs the SMS server 206 to transmit an SMS including a request for deleting the specified IMSI (step S504).

According to an instruction by the issue/cancel processing server 204, the SMS server 206 transmits, to the mobile terminal 300 using the USAT function, an SMS including a request for deleting the IMSI specified (step S506).

The mobile terminal 300 receives the SMS transmitted by the SMS server 206. The SMS is input from the radio unit 302 to the controller 306. The controller 306 sends the SMS to the subscriber authentication module 400 via the subscriber authentication module interface unit 310 (step S508). The controller 306 sends the SMS to the subscriber authentication module 400 using the update command.

According to the instruction to delete the specified IMSI that is included in the SMS, the subscriber authentication module 400 is initialized to the relevant subscriber authentication module. The controller 402 is initialized to the EF_IMSI of the memory unit 404.

The subscriber authentication module 400 makes a response, to the mobile terminal 300, indicating that the EF_IMSI has been initialized (step S512). The controller 402 initializes the EF_IMSI file of the memory unit 404 and makes a response, via the mobile terminal interface unit 406 to the mobile terminal 300, showing that the initializing has succeeded.

When a response is received from the subscriber authentication module 400 indicating that the initializing has succeeded, the mobile terminal 300 transmits, to the SMS server 206, an SMS (below called an SMS response) indicating that the process instructed by the SMS has succeeded (step S514).

When the SMS response is received from the mobile terminal 300, the SMS server 206 transmits, to the subscriber information management server 202, a response indicating that the process instructed by the SMS has succeeded (step S516).

When the user specification is made by operating the mobile terminal 300, a cancel procedure may be performed by making a telephone call to the call center. The cancel procedure leads to performing the cancel setting on the subscriber information management server 202.

Moreover, after the canceling, it may be arranged for re-use of the non-temporary IMSI to be prohibited over a certain period. For example, it may be arranged for a request for use in the IMSI to be denied or the IMSI delivering to be eliminated. When prohibiting re-use of the non-temporary IMSI over a certain period, it may be arranged to report to the user who requested that the non-temporary IMSI be cancelled, so that it is prohibited from being used.

Operation Flow 1

Figure 6:
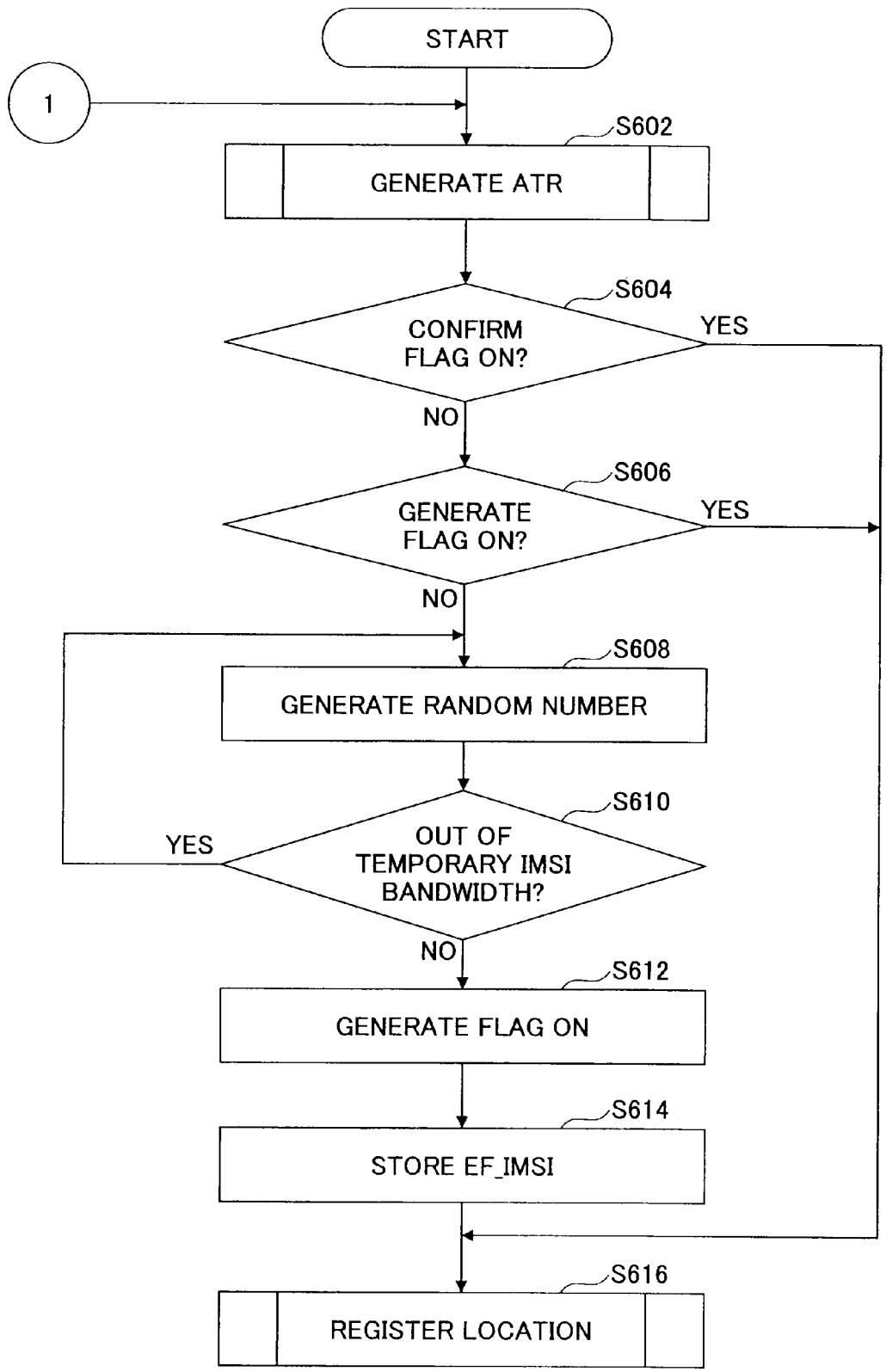
FIG. 6 is a flow diagram illustrating an operation of a system according to an embodiment of the present invention.

FIG. 6 is a flow diagram showing an operation of the subscriber authentication module 400, and the mobile terminal 300 including the subscriber authentication module 400 according to the present embodiment.

The subscriber authentication module 400 generates an ATR (step S602). Based on information stored in the memory unit 404, the controller 402 generates the ATR and sends the generated ATR to the mobile terminal 300.

The subscriber authentication module 400 determines whether a confirm flag is on (indicating the confirmation), the confirm flag indicating that the IMSI stored in the subscriber authentication module 400 has been confirmed. The controller 402 may determine whether the IMSI has been confirmed by referring to a flag showing that the IMSI stored in the memory unit 404 has been confirmed.

When the confirm flag is not on (step S604: NO), the subscriber authentication module 400 determines whether a generate flag is on (showing that the temporary IMSI has been generated) (Step S606). The controller 402 may determine whether the temporary IMSI has been generated by referring to a flag showing that the temporary IMSI stored in the memory unit 404 has been generated.

When the generate flag is not on (step S606: NO), the subscriber authentication module 400 generates random numbers (step S608). When the generate flag is determined to be not on, the controller 402 causes the random number generator 408 to generate random numbers.

The subscriber authentication module 400 determines whether the generated random number is not included in the bandwidth allocated to the temporary IMSI. The controller 402 determines whether the random number generated is not included in the bandwidth allocated to the temporary IMSI (440100000000001 through 440100999999999 in the above described example) (step S610).

When it is determined that the generated random number is not included in the bandwidth allocated to the temporary IMSI (step S610, YES), the process returns to step S608 where a random number is generated again. The random number generation is continued until the generated random number is included in the bandwidth allocated to the temporary IMSI.

When it is determined that the generated random number is included in the bandwidth allocated to the temporary IMSI (step S610, NO), the subscriber authentication module 400 sets the generate flag ON (step S612). The controller 402 turns on the generate flag of the memory unit 404.

Based on the generated random number, the subscriber authentication module 400 generates the temporary IMSI based on the generated random number. For example, the country code and the network code are added to the generated random number to generate the temporary IMSI. The subscriber authentication module 400 stores the temporary IMSI in EF_IMSI (step S614). The controller 402 generates the temporary IMSI based on the random number generated by the random number generator 408, and stores the temporary IMSI in the EF_IMSI file stored in the memory unit 404.

Moreover, when the confirm flag is on in step S604 (step S604: YES) and when the generate flag is on in step S606 (step S606: YES), and after the temporary IMSI is stored in the EF_IMSI in step S614, the mobile terminal 300 performs location registration (step S616). The mobile terminal 300 reads the non-temporary IMSI or temporary IMSI stored in the subscriber authentication module 400, and transmits the same to the subscriber information management server 202 to attempt location registration.

Operation Flow 2

FIG. 7 is a flow diagram illustrating an operation of a system according to an embodiment of the present invention.

Herein, a process similar to the process of location registration explained in step S616 in FIG. 6 is performed (step S702).

The subscriber information management server 202 determines whether the IMSI transmitted by the mobile terminal 300 is a temporary IMSI (step S704). The subscriber information management server 202 determines whether the IMSI transmitted by the mobile terminal 300 is included in the bandwidth allocated to the temporary IMSI.

When the IMSI transmitted by the mobile terminal 300 is a temporary IMSI (step S704:YES), the subscriber information management server 202 determines the validity of the temporary IMSI (step S706). The subscriber information management server 202 determines whether the temporary IMSI duplicates an already delivered temporary IMSI, and if so determines that it is not valid. When the IMSI transmitted by the mobile terminal 300 is not the temporary IMSI, or in other words, when it is a non-temporary IMSI, a location registration is performed.

When it is determined that there is duplication in the temporary IMSI (step S706: YES), the subscriber information management server 202 denies the location registration to the temporary IMSI (step S708). The denial of location registration by the temporary IMSI leads to no response being made to the mobile terminal 300 from the subscriber information management server 202. When a response cannot be received from the subscriber information management server 202 even after a predetermined time has elapsed, the subscriber authentication module 400 determines that the temporary IMSI generated has duplication in the subscriber information management server 202, and sets the generate flag of the temporary IMSI off. Thereafter, the process returns to step S602 in FIG. 6, where the ATR is generated.

When it is not determined that there is duplication in the temporary IMSI (step S706, NO), the subscriber information management server 202 performs the location registration of the temporary IMSI. The subscriber information management server 202 responds to the location registration request from the mobile terminal 300. The response may include information of a successful location registration.

The subscriber information management server 202 generates a non-temporary IMSI (step S712). The subscriber information management server 202 generates the non-temporary IMSI by delivering the non-temporary IMSI in association with the temporary IMSI.

The subscriber information management server 202 sends a request for transmitting the SMS to the SMS server 206 (step S714). The SMS includes the non-temporary IMSI. The SMS server 206 transmits, to the mobile terminal 300, the SMS using the USAT function according to a non-temporary IMSI transmission instruction by the subscriber information management server 202.

The mobile terminal 300 receives the SMS transmitted by the SMS server 206. The SMS is input from the radio unit 302 to the controller 306. The controller 306 sends the SMS to the subscriber authentication module 400 via the subscriber authentication module interface unit 310. The controller 306 sends the SMS to the subscriber authentication module 400 by the update command.

The subscriber authentication module 400 stores the non-temporary IMSI included in the SMS into the subscriber authentication module (step S716). The controller 402 updates, with the non-temporary IMSI, the temporary IMSI stored in the EF_IMSI of the memory unit 404.

The subscriber authentication module 400 sets the generate flag off (step S718). The controller 402 sets off the temporary IMSI flag stored in the memory unit 404.

The subscriber authentication module 400 sets the confirm flag on (step S720). The controller 402 sets on the IMSI flag stored in the memory unit 404.

In the present embodiment, it may be arranged for the random number generator 408 to generate a subscriber identification ID with 9 digits, which is what remains after removing a total of 6 digits (i.e., the country code and the network code, and one digit following (neighboring) the network code) out of a 15-digit IMSI corresponding to a bandwidth allocated to the temporary IMSI. The one digit is fixed to zero. Generating a 9-digit subscriber identity ID, which is what remains after removing the country code and the network code and the one digit following the network code, and fixing the one digit to zero causes the subscriber identity ID generated to be always included in the bandwidth allocated to the temporary IMSI, so that, in the subscriber authentication module 400, the process may be omitted of determining whether the generated subscriber identity ID may be the temporary IMSI.

According to the present embodiment, the subscriber authentication module generates temporary information set for connecting when the connecting information is not set in the subscriber authentication module. By generating the temporary information for connecting, there is no need to set the IMSI in the subscriber authentication module in advance. Therefore, it is possible to avoid the problem of the supply of connecting information becoming exhausted.

The mobile terminal wirelessly transmits, to a subscriber information management server (apparatus), temporary connecting information generated by the subscriber authentication module, and receives the connecting information from the subscriber information management server. Then, the terminal apparatus transmits, to the subscriber authentication module, the connecting information received from the subscriber information management server.

The subscriber authentication module sets the connecting information received from the mobile terminal. Setting the connecting information received from the mobile terminal makes it possible to set a subscriber identification number to be stored in the subscriber authentication module of the mobile terminal at the time of a new contract.

The subscriber information management server determines whether the connecting information is temporary connecting information based on the connecting information wirelessly transmitted by the mobile terminal, and selects the connecting information to be set in the subscriber authentication module when it is determined to be the temporary connecting information. Then, the subscriber information management server transmits, to the mobile terminal, the selected connecting information. When it is determined to be the temporary connecting information, connecting information to be set in the subscriber authentication module is selected to make it possible to select a subscriber identification number of the mobile terminal to be stored in the subscriber authentication module at the time of a new contract.

According to the present embodiment, the connecting information includes an international mobile subscriber identification ID. By generating a number of digits which can be set in the international mobile subscriber identification ID, the temporary connecting information is generated. Generating the number of digits which can be set in the international mobile subscriber identification ID, the temporary IMSI can be generated. For example, it may be arranged for a 10 digit numerical value to be generated that is included in the subscriber identification ID of the international mobile subscriber identification ID.

According to the present embodiment, a range is set for the international mobile subscriber identification ID which can be generated as temporary connecting information. The subscriber authentication module generates temporary connecting information included in the range and the subscriber information management apparatus selects from a range other than the above-mentioned range, connecting information to be set in the subscriber authentication module. By generating the temporary connecting information included in the range of international mobile subscriber identification ID which can be generated as the temporary connecting information, the subscriber information management apparatus can recognize that it is a request for setting an IMSI in the new contract.

According to the present embodiment, the subscriber information management apparatus transmits the connecting information using the short message service function. The connecting information is transmitted using the short messaging service function, making it possible to report the nontemporary IMSI to the mobile terminal.

For convenience of explanation, specific numerical value examples are used to facilitate understanding of the present invention. However, unless otherwise specified, such numerical values are merely exemplary, so that any appropriate value may be used.

As described above, while the present invention is described with reference to specific embodiments, the respective embodiments are merely examples, so that a skilled person will understand variations, modifications, alternatives, replacements, etc. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present application is based on Japanese Priority Patent Application No. 2009-015672 filed Jan. 27, 2009, with the Japanese Patent Office, the entire contents of which are hereby incorporated herein by reference.

What is claimed is:

1. A radio communication system, the system including a subscriber information management apparatus, and a subscriber authentication module mounted in a mobile terminal connectable to a mobile communication network to which the subscriber information management apparatus is connected, wherein
    the subscriber authentication module mounted in the mobile terminal:
        determines whether connecting information is stored in a memory of the subscriber authentication module;
        generates temporary connecting information when it is determined that the connecting information is not stored in the memory;
        stores the temporary connecting information in the memory; and
        stores connecting information included in a response received from the mobile terminal,
    wherein the mobile terminal:
        reads, from the subscriber authentication module, the temporary connecting information;
        transmits, to the subscriber information management apparatus, connecting information including the temporary connecting information;
        receives a response to the transmitted temporary connecting information from the subscriber information management apparatus; and
        transmits, to the subscriber authentication module, the received response;
    wherein the subscriber information management apparatus:
        determines whether temporary connecting information is included in the connecting information based on the connecting information transmitted from the mobile terminal, and, if so, determines validity of the temporary connecting information by determining whether the temporary connecting information has already been delivered;

selects connecting information to be set in the subscriber authentication module when it is determined that temporary connecting information is included and is valid; transmits, to the mobile terminal, a response including the selected connecting information; manages a delivery status of the temporary connecting information; and sets a status of the temporary connecting information as not delivered upon transmitting the response including the selected connecting information.

2. The radio communication system as claimed in claim 1, wherein the connecting information includes an international mobile subscriber identification ID (IMSI), and the subscriber authentication module generates the temporary connecting information by generating a number of digits which can be set in the international mobile subscriber identification ID.

3. The radio communication system as claimed in claim 2, wherein a range is set for the international mobile subscriber identification ID which can be generated as the temporary connecting information, the subscriber authentication module generates the temporary connecting information included in the range, and the subscriber information management apparatus selects the connecting information to be set in the subscriber authentication module from a range other than the range in which the temporary connecting information is included.

4. The radio communication system as claimed in any one of claims 1 through 3, wherein the mobile terminal transmits the connecting information using a short message service function.

5. A method in a radio communication system including a subscriber information management apparatus, and a subscriber authentication module mounted in a mobile terminal connectable to a mobile communication network to which the subscriber information management apparatus is connected, wherein the subscriber authentication module mounted in the mobile terminal performs the determining whether connecting information is stored in a memory of the subscriber authentication module;

generating temporary connecting information when it is determined in said determining step that the connecting information is not stored in the memory;

storing the temporary connecting information in the memory; and storing connecting information included in a response received from the mobile terminal, wherein the mobile terminal performs the steps of:

reading, from the subscriber authentication module, the temporary connecting information;

transmitting, to the subscriber information management apparatus, the connecting information including the temporary connecting information generated in the generating step;

receiving a response to the connecting information transmitted from the subscriber information management apparatus in said transmitting step; and transmitting, to the subscriber authentication module, the response received in said receiving step, wherein the subscriber information management apparatus performs the steps of:

determining, based on the connecting information transmitted by the mobile terminal, whether the temporary connecting information is included in the connecting information, and, if so, determining the validity of the temporary connecting information by determining whether that temporary connecting information has already been delivered;

selecting connecting information to be set in the subscriber authentication module when it is determined in the temporary connecting information determining step that the temporary connecting information is included and is valid, and the temporary connecting information is included and is valid; transmitting to the mobile terminal, a response including the connecting information selected in the selecting step; managing a delivery status of the temporary connecting information; and setting a status of the temporary connecting information as not delivered upon transmitting the response including the connecting information selected in the selecting step.

* * * * *